July 15, 1930.  C. S. DAHLQUIST  1,770,846
UNIVERSAL JOINT
Filed Oct. 10, 1929
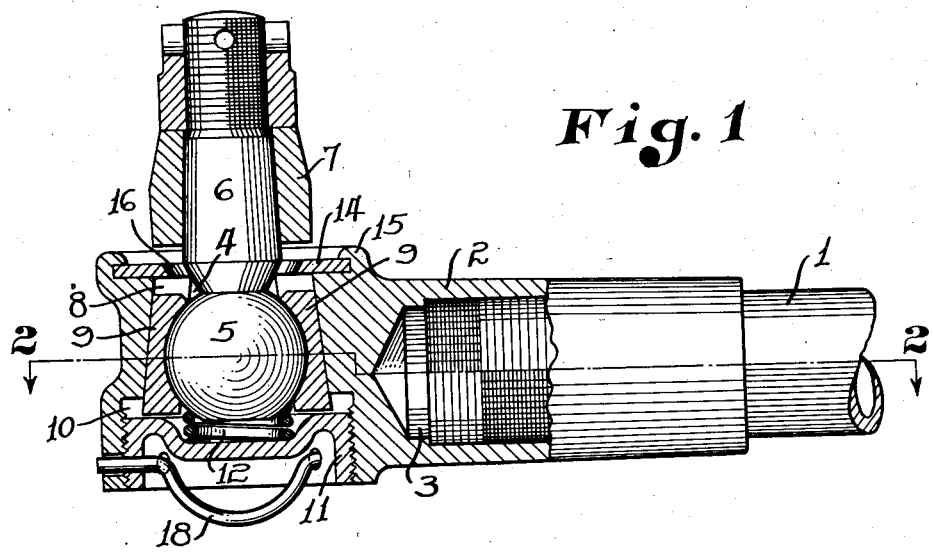
Fig. 1
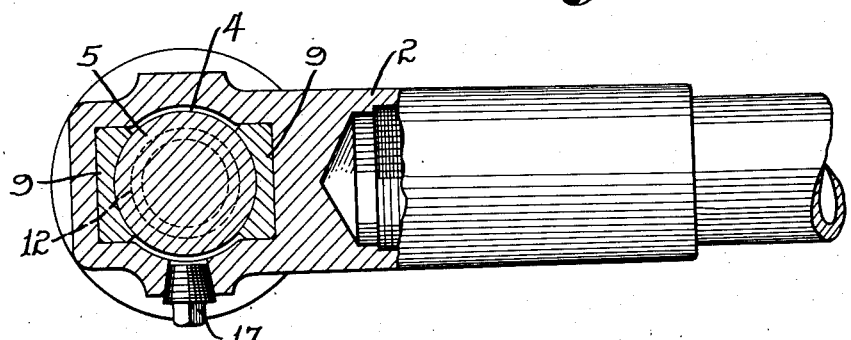
Fig. 2
Fig. 3
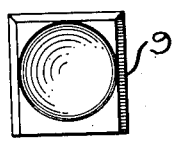
Inventor
Charles S. Dahlquist,
By Owen & Owen.
Attorneys Patented July 15, 1930

1,770,846

UNITED STATES PATENT OFFICE

CHARLES S. DAHLQUIST, OF BOWLING GREEN, OHIO, ASSIGNOR TO SUPERIOR UNIVERSAL PRODUCTS COMPANY, OF BOWLING GREEN, OHIO, A CORPORATION OF OHIO

UNIVERSAL JOINT

Application filed October 10, 1929. Serial No. 398,785.

This invention relates primarily to tie-rods for automobiles and more particularly to the universal joint connections between its ends and the respective steering wheel arms with which associated.

The object of the invention is the provision of a joint of the character described which is simple, strong and inexpensive in its construction and which automatically acts to compensate for wear so that there is no play or looseness at any time between the parts.

The invention is fully described in the following specification, and while in its broader aspect it is capable of embodiment in various forms, a preferred embodiment thereof is illustrated in the following drawings, in which:—

Figure 1 is an elevation of a joint member embodying the invention as applied to a tie-rod, with parts in central longitudinal section. Fig. 2 is another view thereof with a part in section on the line 2—2 in Fig. 1, and Fig. 3 is a face view of one of the bearing blocks of the joint.

Referring to the drawings, 1 designates a tie-rod proper which is provided at each end, as is well understood in the art, with a head or end member 2 that is adjustable on the connecting rod to vary its length as occasion may require. In the present instance, the member 2, one only being shown, is provided in its inner end with a socket 3 in which the respective end of the rod is threaded.

The outer or head end of the member 2 is provided transversely of its axis with a socket 4 for receiving the ball end 5 of a stud member 6, which latter, in the case of a tie-rod, is intended to be connected to the steering arm 7 of the steering wheel spindle. The socket 4 is provided in opposite side walls thereof with straight race-ways 8 for respective bearing blocks 9 to slide in lengthwise of the socket. Each block has its inner face concaved or dished to receive and fit the adjacent side of the ball 5. The race-ways 8 are oppositely inclined with respect to the axis of the socket 4 with the converging ends thereof disposed in the end of the socket from which the ball stud 6 projects.

The inner, or closed, end of the socket 4 terminates in a large cylindrical opening 10 in which a closure plug 11 is removably threaded and which retains the ball member 5 and bearing blocks 4 in assembled relation within the socket. A coiled expansion spring 12 is mounted in the base of the socket 4 between the plug 11 and adjacent sides of the ball member 5 and normally urges said member, and the blocks 4 with it, to move toward the open end of the socket, thereby causing any wear between the faces of the ball member and blocks to be compensated for by the converging movement of the blocks in the inclined ways.

In assembling the parts the plug 11 is screwed into the opening 10 until it comes substantially to a stop against the ends of the blocks 9, indicating that the blocks are tight against the ball member 5. The plug is then given a partial back turn to slightly release the pressure of the bearing blocks on the ball and permit free turning of the ball in its bearing. The ball member and blocks are thus mounted for limited floating movements in the socket, which feature is important for two reasons. First, it tends to relieve the joints of any sudden hammering shocks of the blocks against the plug 11, such shocks being cushioned by the spring 12, and, second, it tends to prevent any continuing locking of the ball member between the bearing blocks which might be occasioned by the blocks being wedged against the ball by the inclined surfaces, inasmuch as the floating action frees and prevents the locking action.

It is found important in practice to have the spring 12 act directly on the ball member, instead of on the bearing blocks, as in this way the spring acts through the ball member to cause or urge the outward movement of the blocks in the inclined ways to compensate for wear and the blocks are free to follow any floating movements of the ball member. This prevents any tendency of the ball member to be locked against movement by the wedging action of the blocks, which would be present if the spring acted directly against the blocks.

The outward end of the socket 4 is partially closed by a ring plate 14, which is secured to the member 2 in the present instance by peening a flange 15 of the member 2 over the same. The central opening of the plate 14 is sufficiently large to permit universal rocking movements of the member 6, which projects therethrough. Suitable provision, not shown, may be made for preventing dust from entering the joint through the plate opening.

One side wall of the socket 4 is provided with an opening through which a lubricant may be introduced into the joint, and which is closed by the removable plug 17. 18 designates a wire member which extends at its ends through registering openings in the block 11 and socket wall in which the block is threaded so as to lock the block against accidental loosening movements.

It is apparent that the movement of the bearing blocks 9, both during adjustment to prevent play between them and the ball 5 and also in compensating for wear, is axially of the socket 4 or at right angles to the axis of the rod, which thereby permits any such adjustment to take place without varying the distance between the centers of the two ball joints of the tie-rod. This is important in connection with the tie-rod use, as any varying of the distance between the centers of the ball joints will cause a throwing of the connected wheels out of parallel relation, which will necessitate an adjustment of the rod as to length in order to compensate for the variance. It is further apparent that the bearing relation of the blocks 9 to the ball 5 remains constant during wear adjustment of the parts. In other words, there is no movement of the blocks about the ball axis during such adjustment. This is an important feature.

This application is filed as a continuation of my former application, Serial Number 384,962, filed August 10, 1929, as to so much of the matter herein as is common to said prior application.

I wish it understood that my invention is not limited to any specific construction, arrangement or form of the parts, as it is capable of numerous modifications without departing from the spirit of the claims.

Having thus described my invention, what I claim as new, and desire to secure by Letters Patent is,—

1. In a joint of the character described, a member having a socket therein and provided with race-ways in its opposite side walls extending in straight lines lengthwise of the socket and inclined in converging relation from their inner ends outwardly, a ball disposed in said socket, bearing blocks mounted in said race-ways for movement lengthwise thereof and having their opposing faces recessed to fit opposite sides of said ball, and yieldable means acting solely and directly against the ball to urge movements thereof and the blocks therewith toward the outer end of the socket.

2. In a joint of the character described, the combination with a member having a socket therein and a ball disposed in said socket, of bearing blocks at opposite sides of the ball, said blocks having their bearing faces recessed to fit the ball and said socket having surfaces for effecting movements of the blocks longitudinally thereof and in planes converging outwardly from the inner end of the socket, and resilient means acting solely and directly against the ball for normally urging outward movements of the ball and the blocks therewith in the socket.

3. In a joint of the character described, the combination with a member having a socket therein and a ball disposed in said socket, of bearing blocks at opposite sides of the ball and recessed at their inner faces to receive the ball, said member having means for mounting said blocks in said socket for movements lengthwise thereof in planes which converge outwardly from the inner end of the socket, which means also has parts for preventing the blocks from having side-edgewise movement relative to the ball, and yielding means acting solely and directly against the ball and through it on the blocks to urge outward movements of the ball and blocks in the socket.

4. In a joint of the character described, a head member having a socket therein converging from its inner end outwardly, a ball in said socket, bearing blocks fitting opposite sides of said ball and mounted in said socket for lengthwise movements therein, an element at the inner end of the socket, and spring means engaged with said element and acting solely and directly against the ball for normally urging outward movements of the ball and the blocks therewith in the socket.

5. In combination with a tie-rod, a head member at one end of the tie-rod having a socket which is transverse to the axis of the tie-rod, a ball in said socket having a part projecting outwardly therefrom, bearing blocks fitting opposite sides of the ball, said socket having means for mounting said blocks for free slidable movements lengthwise thereof in planes which converge outwardly from the inner end of the socket, and yieldable means retaining the blocks and ball in the socket and acting solely and directly against the ball for normally urging outward movements of the ball and blocks therein, the bearing relation of the blocks to the ball being unchangeable during lengthwise movements thereof in the socket.

6. In a joint of the character described, a head member having an opening therethrough with race-ways in its opposite side walls converging toward one end of the opening, a ball in said opening having a shank portion projecting out through the end of the opening toward which the race-ways converge, bearing blocks fitting opposite sides of said ball and mounted in said race-ways for lengthwise movements therein, each race-way having opposed side walls to engage the side walls of the blocks, an element removably closing the opposite end of said opening and adjustable therein lengthwise of the opening and adapted to coact with the adjacent ends of said blocks to initially adjust the position of the blocks in the opening and permit limited axial play of the blocks therein, and spring means seated on said element and acting solely and directly against the ball for normally urging movements of the ball and the blocks therewith away from said element.

7. In a joint of the character described, a head having an opening therethrough with opposing side surfaces relatively converging toward one end of the opening, a ball in the opening having a shank projecting through the end of the opening at the converged ends of said surfaces, bearing blocks fitting opposite sides of said ball and mounted to have lengthwise movements on said surfaces, an element in the opposite end of said opening, means for mounting said element for cooperation with the blocks to initially position the blocks in the opening in predetermined bearing relation to the ball, means for securing said element in its said adjusted position with respect to the head, and spring means disposed within the opening and seated on said element and acting solely and directly against the ball for normally urging movements of the ball and blocks toward the end of the opening through which the ball shank projects.

In testimony whereof I have hereunto signed my name to this specification.

CHARLES S. DAHLQUIST.